United States Patent [19]

Te-Long

[11] Patent Number: 4,596,537
[45] Date of Patent: Jun. 24, 1986

[54] VENTILATION DEVICE FOR A STEPLESS SPEED-CHANGE TRANSMISSION

[76] Inventor: Lin Te-Long, No. 6, Long 26, Alley 284, pu-Tzu-Keng, Tai-Ping Hsiang, Taichung Hsien, Taiwan

[21] Appl. No.: 625,123

[22] Filed: Jun. 27, 1984

[51] Int. Cl.⁴ ............................................. F16H 57/04
[52] U.S. Cl. ....................................................... 474/93
[58] Field of Search ............................................ 474/93

[56] References Cited

U.S. PATENT DOCUMENTS

| | | | |
|---|---|---|---|
| 2,145,545 | 1/1939 | Johnson et al. | 474/93 X |
| 3,005,357 | 10/1961 | Christian | 474/93 X |
| 3,467,177 | 9/1969 | Hoddinott | 474/93 X |
| 4,422,498 | 12/1983 | Chen | 474/93 X |

Primary Examiner—Stephen J. Novosad
Assistant Examiner—Frank McKenzie
Attorney, Agent, or Firm—Holman & Stern

[57] ABSTRACT

This utility concerns about a kind of ventilation device comprising a pair of fans slantly installed on the cover of a stepless speed-change device (a belt transmission), especially that used in a vertical milling machine.

1 Claim, 2 Drawing Figures

VENTILATION DEVICE FOR A STEPLESS SPEED-CHANGE TRANSMISSION

Two cooling fans as the main part of this utility are fixed on the slanted face of the top surface of the cover; around the cover, two front air entrances are bored in its front well, an upper air entrance in its upper surface and a back air entrance in its back wall. As the cooling fans are turned on to rotate, the cool air outside sucked through all the four entrances into the cover, will flow along the air routes accomplishing the function of cooling every part in the cover.

The heat resulted from the high-speed friction between the speed-change belt and the belt pulleys can be carried off by the air flowing along its routes and directly drawn by the two slanted fans in this utility without hindrance of the belt and be sucked out of the cover; and consequently its interior can be effectively prevented from accumulating high heat.

DETAILED DESCRIPTION OF THE UTILITY

Figures 1, 2:
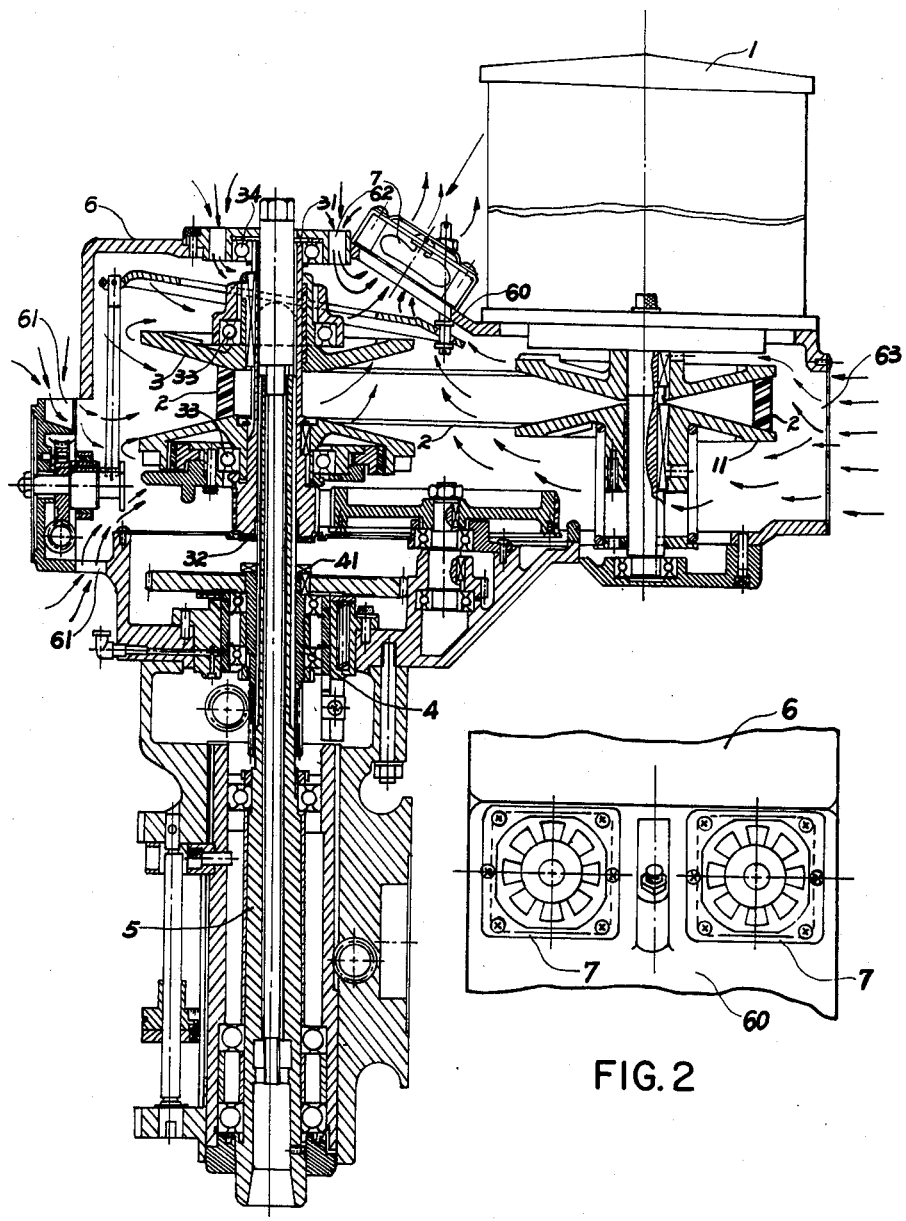
FIG.1 is the cross-sectional view of this utility.
FIG. 2 is a view in the direction of arrow C on FIG. 1.

The structure of this utility is described with reference to FIG. 1 as follows.

A vertical milling machine with a stepless speed-change device (a belt transmission) is driven by motor 1 moving belt pulley 11 fixed around the shaft of moter 1 inside cover 6 of said milling machine; then belt pulley 3 is rotated by speed-change belt 2. Said belt pulley 3 then transmits the movement to its shaft 31 which, as clutch 32 attached with shaft 31 is geared with another clutch 41 fixed with main shaft bush 4, is consequently to cause said main shaft bush 4 and then main shaft 5 to rotate for cutting job.

The above-mentioned transmission structure is all installed in said cover 6 made of a sealed metallic shell so that the growing high heat caused by the highspeed friction between those moving parts can not effectively exhausted out of cover 6 and may gradually diminish the precision of main shaft 5 and may cause damage and distortion of other parts. So, how to improve the cooling device for the power transmission in said milling machine is one of the important task for those who are concerned. As there is no alternative for getting rid of the heat inside cover 6 except to install fans on it; in other words the heat in cover 6 can only be discharged by means of cooling fans. The inventor of this utility, with view to obtain an maximum cooling effeciency, had experimented setting one or two fans on different spots all over cover 6 but had been unable to find an ideal result. After a tireless further study, he has found that the heat is mostly generated from the abrasion between speed-change belt 2 and two belt pulleys 3,11 and unable to be sucked out effectively by the fans set on the side walls of cover 6, for the heat is blocked by said belt 2 itself. Finally this utility has been worked out to get the maximum effeciency in cooling the heat inside cover 6. The detailed description of this utility is as follows.

This utility is to install two cooling fans 7 in a tilted way on slanted face 60 of the top surface of cover 6. Two front air entrances 61 are bored in the front wall of cover 6, upper air entrance 62 in the top surface and back air entrance 63 in its back wall. All the above-mentioned air entrances are designed to match cooling fans forming a plurality of air routes densely spreading all over the interior of cover 6.

The outside cool air flows into cover 6 through two front air entrances 61, then in turn past belt pulley 3, speed-change belt 2, the space surrounded by said belt 2, the friction surfaces between said belt 2 and said pulley 3, and finally then be sucked by said fans 7 and exhausted out of cover 6. Meanwhile, the air flowing into cover 6 through back air entrance 63 passes along belt pulley 11, said belt 2, and then is to be sucked upward out of cover 6 by said fans 7. In fact, the above-mentioned air routes are formed due to the continuous sucking the hot air out of cover 6 and the continuous sucking fresh air from the outside into cover 6 through the four air entrances. Furthermore, since said fans 7 starts working at the same time as motor 1 is turned on, every air route can move along the whole body of said belt 2, whose friction heat actually is cooled by the manifold routes of cool air. The key point of acquiring such an excellent result lies in having said fans installed in slanted face 60 of the top surface of cover 6; said slanted face 60, no doubt, should be situated at the middle of the top surface of cover 6 so as to match well with the position of every part of the belt transmission device. In addition, two cooling fans are fixed in parallel in a tilted way, so the air exhausted out through them flows toward the cover of motor 1 making the air around it circulate and thus serving to cool motor 1 in a great extent.

Said cooling fans in this utlity sucks the hot air generated by said belt 2 and said pulleys 3,11 but also by two bearings 33 supporting said pulley 3 and by bearing 34 supporting shaft 31, etc. Such an air cooling method is quite effective for main shaft 5 to maintain its precision.

Conclusively, it is of no doubt that with the aid of said four air entrances cooling fans 7 slantly fixed on said slanted face of cover 6 and facing downward is really an improved utility for a vertical milling machine.

What is claimed is:
1. A ventilation device comprising a pair of fans and four air entrances bored in a cover enveloping a belt transmission of a vertical milling machine; said fans to be installed in parallel in a top surface of said cover; two front air entrances to be bored in a front wall of said cover, one upper air entrance in the top surface of said cover one back air entrance in a back wall of said cover; said four air entrances together with said fans at work forming manifold air-flowing routes, which can carry away the friction heat caused by the belt, the belt pulleys moving with high speed; the hot air thus generated to be sucked out of said cover by said fans being effectively prevented from accumulating inside said cover.

* * * * *